United States Patent
Schmidt et al.

(10) Patent No.: US 12,030,517 B2
(45) Date of Patent: Jul. 9, 2024

(54) METHOD AND SYSTEM FOR DETERMINING A DRIVING MANEUVER

(71) Applicant: ZF Automotive Germany GmbH, Aldorf (DE)

(72) Inventors: Manuel Schmidt, Dortmund (DE); Christian Wissing, Wesel (DE); Andreas Homann, Dortmund (DE); Christian Lienke, Dortmund (DE); Torsten Bertram, Düsseldorf (DE); Carlo Manna, Genk (BE); Karl-Heinz Glander, Monheim (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 16/799,882

(22) Filed: Feb. 25, 2020

(65) Prior Publication Data
US 2020/0269871 A1 Aug. 27, 2020

(30) Foreign Application Priority Data
Feb. 27, 2019 (DE) .................. 10 2019 104 974.1

(51) Int. Cl.
*B60W 60/00* (2020.01)
*G01C 21/34* (2006.01)
*G05D 1/00* (2024.01)

(52) U.S. Cl.
CPC ....... *B60W 60/001* (2020.02); *G01C 21/3453* (2013.01); *G05D 1/0212* (2013.01)

(58) Field of Classification Search
CPC ......... B60W 60/001; B60W 2720/106; B60W 2754/20; B60W 2754/30; B60W 60/0011;
(Continued)

(56) References Cited

U.S. PATENT DOCUMENTS 10,207,560 B2    2/2019  Banvait et al.
2011/0184605 A1*  7/2011  Neff ..................... G05D 1/0255
                                                     701/25
(Continued)

FOREIGN PATENT DOCUMENTS

DE        102016207276        11/2017

*Primary Examiner* — Aaron L Troost
(74) *Attorney, Agent, or Firm* — ROSSI, KIMMS & McDOWELL LLP (57) ABSTRACT

A method for determining a driving maneuver includes obtaining vehicle parameters (P) from a driving maneuver planning module (22) of the vehicle (10). At least one possible driving maneuver (M) is determined via the driving maneuver planning module (22) based on the vehicle parameters (P) received by means of at least one decision-making submodule of the driving maneuver planning module (22), At least one possible driving maneuver (M) is transmitted to a motion planning module (24) of the vehicle (10). An evaluation variable (B) is obtained from the motion planning module (24) via the driving maneuver planning module (22). The at least one decision-making submodule is adapted based on the evaluation variable (B) obtained. Furthermore, a system for determining a driving maneuver of a vehicle, a vehicle for executing the driving maneuver, a control device for a vehicle and a computer program for executing the method are shown.

15 Claims, 4 Drawing Sheets

(58) Field of Classification Search
CPC .. G01C 21/3453; G05D 1/0212; Y02T 10/84; G06Q 10/0637; G06Q 50/30; G06N 20/00
USPC .......................................................... 701/26
See application file for complete search history.

(56) References Cited

U.S. PATENT DOCUMENTS

| | | | |
|---|---|---|---|
| 2013/0325306 A1* | 12/2013 | Caveney | B60W 30/0953 |
| | | | 701/117 |
| 2018/0105009 A1* | 4/2018 | Banvait | B60G 17/0162 |
| 2018/0237005 A1 | 8/2018 | Duan et al. | |
| 2018/0292830 A1* | 10/2018 | Kazemi | G01C 21/3453 |
| 2018/0319403 A1* | 11/2018 | Buburuzan | B62D 15/0255 |
| 2018/0321689 A1* | 11/2018 | Lehmann | G08G 1/163 |
| 2019/0049961 A1* | 2/2019 | Battles | G08G 5/0021 |
| 2019/0209098 A1* | 7/2019 | Yu | A61B 5/0077 |
| 2020/0026277 A1* | 1/2020 | Palanisamy | G06N 3/0472 |

* cited by examiner

METHOD AND SYSTEM FOR DETERMINING A DRIVING MANEUVER

RELATED APPLICATIONS

This application claims priority from German Application No. 10 2019 104 974.1 filed Feb. 27, 2019, the subject matter of which is incorporated herein by reference in its entirety.

BACKGROUND OF THE INVENTION

The invention relates to a method and a system for determining a driving maneuver of a vehicle, a vehicle for executing a driving maneuver, a control device for a vehicle for controlling a vehicle and a computer program for performing the method.

One of the main challenges for the autonomous or semi-autonomous control of a vehicle is determining a driving maneuver for the vehicle. Possible driving maneuvers are typically determined based on the data collected from the vehicle such as the number of trafficable lanes of a road, the movement trajectories of adjacent vehicles, and/or the navigation data in order to reach a desired destination.

Systems which use a route planning module (also known as a "mission planning framework") for planning the route of the vehicle are known from prior art. The systems use the current location and the destination for this purpose. Furthermore, the systems have a driving maneuver planning module (also known as a "behavioral planning framework"), which plans a driving maneuver based on sensor data. The driving maneuver generated from the route planning module and the driving maneuver planning module is transmitted to a motion planning module (also known as the "motion planning framework") that executes the driving maneuver.

One disadvantage of these systems, however, is that the selection of the driving maneuver is based on theoretical considerations only.

SUMMARY OF THE INVENTION

It is therefore the object of the invention to provide a method for determining a driving maneuver that takes practical feedback into account when selecting driving maneuvers.

The object according to the invention is achieved by a method for determining a driving maneuver of a vehicle. First, a driving maneuver planning module of the vehicle receives vehicle parameters. Based on the vehicle parameters received, the driving maneuver planning module determines at least one possible driving maneuver by means of at least one decision-making submodule of the driving maneuver planning module. Then, a driving maneuver is selected and transmitted to a motion planning module of the vehicle. The driving maneuver planning module receives an evaluation variable from the motion planning module. Finally, the at least one decision-making submodule is adjusted on the evaluation variable received.

According to the invention, the motion planning module and the driving maneuver planning module are connected to one another, with the driving maneuver planning module determining at least one possible driving maneuver and transferring at least one driving maneuver to the motion planning module. The driving maneuver planning module receives an evaluation variable for the transmitted driving maneuver, which contains practical feedback about the transmitted driving maneuver. Based on the practical feedback, the at least one decision-making submodule of the driving maneuver planning module is then adapted so that practical bases can be used in addition to theoretical bases for selecting the driving maneuver.

The motion planning module can be cloud-based or server-based or implemented locally in the vehicle. In other words, the motion planning module does not have to be executed inside the vehicle.

A corresponding IT infrastructure may be provided in a vehicle, for example, so that the motion planning module is provided by the IT infrastructure inside the vehicle.

Alternatively, the motion planning module can also be executed on a central server, with the server receiving the vehicle parameters from the vehicle. In this case, the vehicle parameters are transmitted via a network, for example the In general, it is also conceivable that the IT infrastructures of adjacent vehicles, i.e. vehicles that are within a certain maximum distance from each other, join together and the motion planning module is provided on the IT infrastructure of the vehicles.

The same applies to the driving maneuver planning module as well.

The vehicle parameters that the driving maneuver planning module receives may be position data, i.e. information about the current geographic location of the vehicle, based on GNSS data, acceleration and/or speed data of the vehicle, optical distance and speed measurements, provided by a LIDAR sensor (light detection and ranging), for example, and/or a radar sensor, camera data, the number of trafficable lanes, the trajectories of adjacent cars and/or navigation data.

This data can be recorded by sensors of the vehicle, originate from adjacent vehicles and/or can also be transmitted to the vehicle from a central server via a wireless interface. In one embodiment of the invention, a driving maneuver to be executed is selected from the at least one driving maneuver, with the motion planning module controlling the vehicle in such a way that the vehicle executes the driving maneuver to be executed. The motion planning module can thus directly evaluate the driving maneuver that has been executed.

In order to take into account uncertainties in the various vehicle parameters and to assess the feasibility of the selected driving maneuver, the motion planning module can perform a reachability analysis.

The evaluation variable can be determined by the motion planning module based on the executed driving maneuver and/or based on the vehicle parameters during the execution of the driving maneuver. The evaluation variable is thus directly dependent on the executed driving maneuver so that the decision-making submodule can be adapted directly to the execution of the driving maneuver.

The evaluation variable can, for example, be the smallest distance to at least one adjacent vehicle during the driving maneuver, the highest lateral acceleration of the vehicle during the driving maneuver, the highest longitudinal acceleration of the vehicle and/or a cost value of the driving maneuver.

In general, it is also conceivable that the evaluation variable has multiple values. The evaluation variable may be a vector, for example, that contains one or more of the aforementioned values.

Furthermore, the evaluation variable may be a multidimensional vector and comprise, for example, one or more of the previously mentioned value or values for each time step of the driving maneuver.

The time step can be based on the time resolution of one or more sensors of the vehicle or can be a freely selected value, for example 10 ms.

Knowledge data may be transmitted to other vehicles in order to provide them with information about the executed driving maneuver. The knowledge data includes at least the vehicle parameters, the driving maneuver to be executed, the driving maneuver that was executed and/or the evaluation variable.

A decision-making submodule of the further vehicle may be adapted on the basis of the transmitted knowledge data.

This means that several vehicles that have a corresponding decision-making submodule can use the knowledge data from a driving maneuver that has been executed and adapt their decision-making submodule based on a driving maneuver that has been executed. Accordingly, the vehicles no longer have to execute the driving maneuver themselves and at least one decision-making submodule can learn faster to provide better driving maneuvers.

In one embodiment of the invention, the server determines the required adaptation of the decision-making submodule of the further vehicles based on the driving maneuver executed by a given vehicle.

Alternatively, it is also conceivable for the IT infrastructure of the further vehicles to determine the necessary adaptations of the respective, at least one decision-making submodule, based on the driving maneuver executed.

In general, it is also conceivable that the server processes and/or transmits the vehicle parameters, the selected driving maneuvers, the executed driving maneuver and/or the evaluation variable, that is to say in general the knowledge data.

In one embodiment of the invention, the at least one decision-making submodule is able to determine the possible driving maneuver on the basis of a state machine.

The possible driving maneuver is accordingly determined by a model that describes the behavior of the vehicle with states, state transitions and actions. Driving on the freeway, parking in the parking lot, waiting at the traffic lights, driving through a restricted traffic zone, turning off at an intersection, etc. can be considered a state, and the actions would then be the corresponding driving maneuvers that the vehicle can carry out in the corresponding states. The performance of a driving maneuver can then lead to a state transition.

It is also conceivable that the at least one decision-making submodule determines the possible driving maneuvers by using a cost function.

A cost function is generally understood to be a function that assigns a value to an action or a route, which indicates the cost of the corresponding action or the corresponding route. The best driving maneuver can be determined by comparing several values, namely the action or the route that has the lowest value and thus the lowest cost.

Each lane is parameterized with a cost function, for example, so that the at least one decision-making submodule can decide by comparing the cost functions of the different lanes whether the vehicle is in the best-possible lane and if not can determine a corresponding lane change as a driving maneuver.

In one embodiment of the invention, the at least one decision-making submodule identifies a possible driving maneuver on the basis of a vehicle-following model. Vehicle-following models are generally models that determine driving maneuvers on the basis of the driving maneuvers of other vehicles.

The at least one decision-making submodule may be a distance-dependent vehicle-following model so that possible driving maneuvers are determined on the basis of the distance to adjacent vehicles.

According to Wiedemann, in one embodiment of the invention, the vehicle-following model is a psychophysical following model in which four driving modes are used, namely normal driving, approaching, following and braking. Depending on the speed of and the distance from an adjacent vehicle, a distinction is made between a range allowing for free driving behavior, a following range, an approaching range, a braking range and a collision range so that possible driving maneuvers, which on the driving modes are determined based on the range in which the vehicle is located.

For example, the at least one decision-making submodule determines the possible driving maneuver with the help of a decision tree, i.e., with the help of decision rules.

In general, a combination of the decision-making submodules mentioned is possible as well. The at least one decision-making submodule can, for example, determine the possible driving maneuver based on a cost function, a decision tree, a vehicle-following model, in particular a distance-dependent vehicle-following model and/or a psychophysical vehicle-following model according to Wiedemann, and/or a state machine.

These models are tried and tested methods for determining appropriate driving maneuvers in different driving situations.

At least one of the at least one decision-making submodules can perform the possible driving maneuver by means of a machine learning decision process, in particular a reinforcing machine learning decision process.

The at least one decision-making submodule thus generates artificial experience from the possible driving maneuvers, the driving maneuver to be executed and/or the driving maneuver that was executed. The at least one decision-making submodule is thus trained by the driving maneuvers.

In reinforcing machine learning decision processes, the process independently learns a strategy to maximize received rewards. The machine learning decision process receives a reward, for example, if specified distances from adjacent vehicles are maintained during a driving maneuver.

The evaluation variable can be used as a reward for driving maneuvers which are executed in accordance with road traffic regulations to which at least one decision-making submodule is transmitted. The decision-making submodule can thus be modified so that driving maneuvers are executed in accordance with road traffic regulations.

In one embodiment, the machine learning decision process is a monitored or partially monitored machine learning decision process, according to which the possible driving maneuvers are monitored by a driver.

The possible driving maneuver determined by the machine learning decision process is, for example, compared with a driving maneuver executed by a driver of the vehicle.

It is conceivable that the machine learning decision process is realized at least by a neural network, is based on game theory, is a Markow decision process and/or a partially observable Markow decision process. Some of the observable decision processes are also known in English as "partially observable Markow decision processes". In Markow decision processes, the vehicle is, similar to state machines, described with states, actions and state transitions. A reward function is provided as well, for example the evaluation variable that assigns a reward to a particular state transition and a policy that assigns the best-possible action to every state. A discount factor with which all rewards still achievable after an action are reduced is provided as well. The decision-making submodule can independently determine driving maneuvers by means of the Markow decision processes.

In terms of game theory, the machine learning decision process in one embodiment of the invention can determine the possible driving maneuvers of adjacent vehicles and assign them probabilities so that at least one possible driving maneuver is determined based on the possible driving maneuvers of adjacent vehicles.

In one embodiment of the invention, the evaluation variable is used to train a machine learning decision process of the at least one decision-making submodule. The decision-making submodule can thus be trained directly by the evaluation variable.

In other words, a person who trains the machine learning decision process is not necessarily necessary, but the machine learning decision process is trained based on the evaluation variable. This makes it possible to reduce the required teaching resources.

In order to use the strengths of the individual methods for determining a driving maneuver, several decision-making submodules can be provided, each of which determines at least one possible driving maneuver. In this case, a decision maker selects one of the determined possible driving maneuvers to be executed, which is then transmitted to the motion planning module.

In one embodiment of the invention, the decision maker is a driver of the vehicle, a selection module or a combination thereof.

The selection module selects the driving maneuver to be executed, for example based on the weighting of the credibility of the corresponding decision-making submodule and/or the frequency of occurrence of a possible driving maneuver.

In general, it is conceivable that the weighting of the credibility depends on the number of already determined driving maneuvers and/or on the driving situation.

A possible driving maneuver from a certain decision-making submodule may therefore be preferred in a certain driving situation, for example when turning or overtaking another vehicle.

The credibility weighting may also be adapted to the evaluation variable so that the driving maneuver of the corresponding decision-making submodule receives a higher weighting in further selection processes of driving maneuvers or the corresponding decision-making submodule itself.

In one embodiment of the invention, the selection module may comprise an artificial neural network and be trained accordingly to select a driving maneuver in certain driving situations.

The object according to the invention is further achieved by a control device for a vehicle for controlling the vehicle, the control device being designed to execute the method described above. Regarding the advantages and features, reference is made to the above explanations provided for the method, which apply equally to the control unit.

In addition, the object according to the invention is achieved by a vehicle with a previously described control unit and a sensor for detecting at least one vehicle parameter with the vehicle being configured to perform the method described above. In this regard as well, reference is made to the above explanations provided for the method in terms of the advantages and features, which apply to the vehicle as well.

The object according to the invention is further achieved by a computer program with program code means for the steps of the method described above if the computer program is executed on a computing unit, in particular a computing unit of a control device described above. With regard to the advantages and features, reference is also made here to the above explanations, which apply equally to the computer program with program code means.

The term "program code means" refers here and below to computer-executable instructions in the form of program code and/or program code modules in compiled and/or in uncompiled form, which may be present in any programming language and/or in machine language.

Furthermore, the object according to the invention is achieved by a system for determining a driving maneuver with at least one vehicle as described above. With regard to the advantages and features, reference is also made here to the above explanations, which apply equally to the system.

In particular, two of the vehicles described above may be provided for the system. In one embodiment of the invention, the system has a server which is connected to the at least one vehicle for data connection, with the motion planning module controlling the vehicle in such a way that the vehicle executes a driving maneuver, wherein the server receives and/or provides knowledge data from one of the vehicles, and the server transmits the knowledge data to the at least one further vehicle, and/or the server determines the adaptation of the decision-making submodule of the at least one other vehicle on the basis of the knowledge data and transmits said adaptation information to the at least one further vehicle. By means of this system, the vehicles can access the knowledge data of the other vehicles so that the decision-making submodules can be adapted faster and better.

The decision-making submodule of a vehicle can therefore be adapted, in particular, based on driving maneuvers executed by other vehicles.

Here too, the knowledge data includes at least the knowledge data of the one vehicle that is executing the driving maneuver, i.e., the vehicle parameters, the possible driving maneuvers, the driving maneuver to be executed, the driving maneuver that was executed and/or the evaluation variable.

The server can be reached by the vehicles, for example via a network such as the Internet.

Further advantages and features are outlined in the following description and accompanying drawings to which reference is made below. In these drawings.

DESCRIPTION

Figure 1:
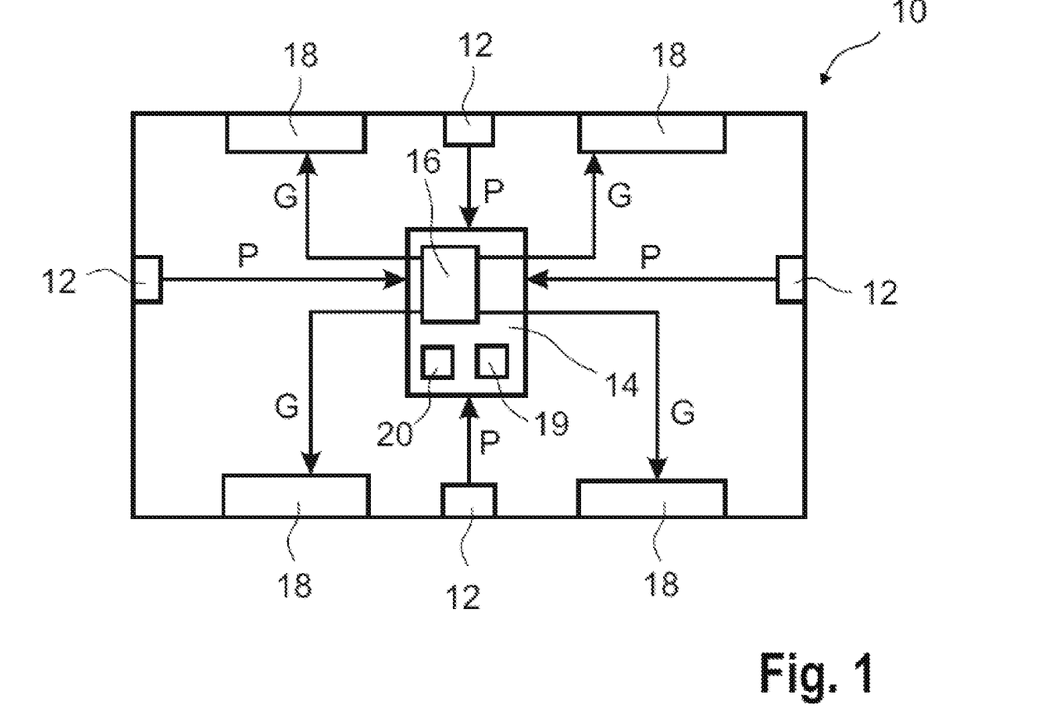
FIG. 1 shows a schematic illustration of a vehicle, according to the invention, with a control device, according to the invention, for a system, according to the invention, for determining a driving maneuver.

FIG. 1 shows a schematic illustration of a vehicle 10. The vehicle 10 comprises several sensors 12, one control unit 14, one driver assistance system 16 and a plurality of control devices 18 for controlling the vehicle 10.

The vehicle 10 is, for example, a motor vehicle for road traffic such as a truck or a car.

The sensors 12 are arranged on the front, rear and/or on the sides of the vehicle 10 and are designed to detect the surroundings of the vehicle 10 and/or data related to the vehicle 10. The sensors 12 generate the corresponding vehicle parameters P and transmit them to the control unit 14, as shown by the arrows in FIG. 1.

The sensors 12 include a position sensor 26 (FIG. 3), for example a satellite-based position sensor, which determines the current geographic position of the vehicle 10. The position sensor 26 accordingly generates position data as the vehicle parameters P.

A camera sensor 28 (FIG. 3) is provided as well, which records images and/or videos of the surroundings of the vehicle 10 by means of a camera, which is not shown. The camera sensor 28 correspondingly generates camera data as vehicle parameters P. Using the camera sensor 28, adjacent vehicles can be detected, the lane boundaries recognized and/or striking objects captured.

"Striking objects" are understood to mean, for example, traffic signs and/or sights in the surrounding area.

In addition, an acceleration and/or speed sensor 30 (FIG. 3) is provided, which records the acceleration and/or speed data of the vehicle 10 the vehicle parameters P.

Furthermore, an optical sensor 32 (FIG. 3), for example a LIDAR and/or radar sensor, is provided, which generates the distances from adjacent objects and the speeds of the adjacent objects, for example adjacent vehicles, as vehicle parameters P.

For illustration purposes, a separate sensor 12 was described for each of these vehicle parameters P. Of course, a separate sensor 12 is not necessary for each of these vehicle parameters P.

The control device 14 comprises a data carrier 19 and a computing unit 20 with a computer program being stored on the data carrier 19, which is executed in the computing unit 20 and comprises the program code means for determining a driving maneuver according to the method described below.

The control unit 14 may also include the driver assistance system 16. However, it is also conceivable that the driver assistance system 16 is configured as a separate system.

In general terms, the vehicle parameters P are transmitted to the control unit 14, the control unit 14 processes the vehicle parameters P received from the sensors 1 and controls the vehicle 10 at least semi-automatically, in particular fully automatically, by using the driver assistance system 16.

The vehicle parameters P can also be transmitted to the control unit 14 from adjacent vehicles and/or a central server via a network.

The driver assistance system 16 can at least control a transverse movement and/or a longitudinal movement of the vehicle 10 in a semi-automated manner, preferably in a fully automatic manner. In FIG. 1, this is shown schematically by the arrows, which represent the signals G transmitted to the corresponding control devices 18 of the vehicle 10.

Figure 2:
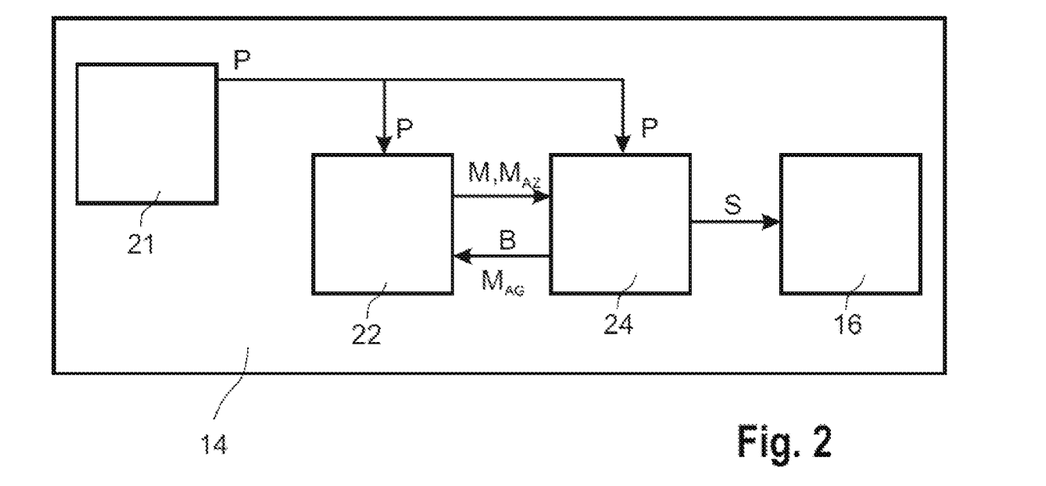
FIG. 2 shows a schematic block diagram of the control unit for determining a driving maneuver from FIG. 1.

FIG. 2 shows a block diagram of the control unit 14. The control unit 14 has a vehicle parameter acquisition module 21, a driving maneuver planning module 22 and a motion planning module 24.

The vehicle parameter acquisition module 21 collects and/or generates the vehicle parameters P, for example with the sensors 12, and transmits them to the driving maneuver planning module 22 and the motion planning module 24.

The driving maneuver planning module 22 determines at least one possible driving maneuver M, said determination including the vehicle parameters P and transmits at least one of the possible driving maneuvers M and/or a driving maneuver $M_{AZ}$ to the motion planning module 24.

The motion planning module 24 evaluates the at least one possible driving maneuver M and/or the driving maneuver MAZ to be executed, i.e., it calculates an evaluation variable B and generates control commands S for controlling the vehicle 10.

The control commands S are transmitted to the driver assistance system 16, which in turn transmits the signals G (FIG. 1) to the control devices 18 of the vehicle 10.

The motion planning module 24 transmits the driving maneuver MAG that has been executed and/or an evaluation variable B of the driving maneuver to the driving maneuver planning module 22, which, with the help of the executed driving maneuver MAG that was executed and/or the evaluation variable B, improves the decision process for selecting the driving maneuvers M, for example by adjusting a decision-making submodule 38 (FIG. 4) of the driving maneuver planning module 22.

Figure 3:
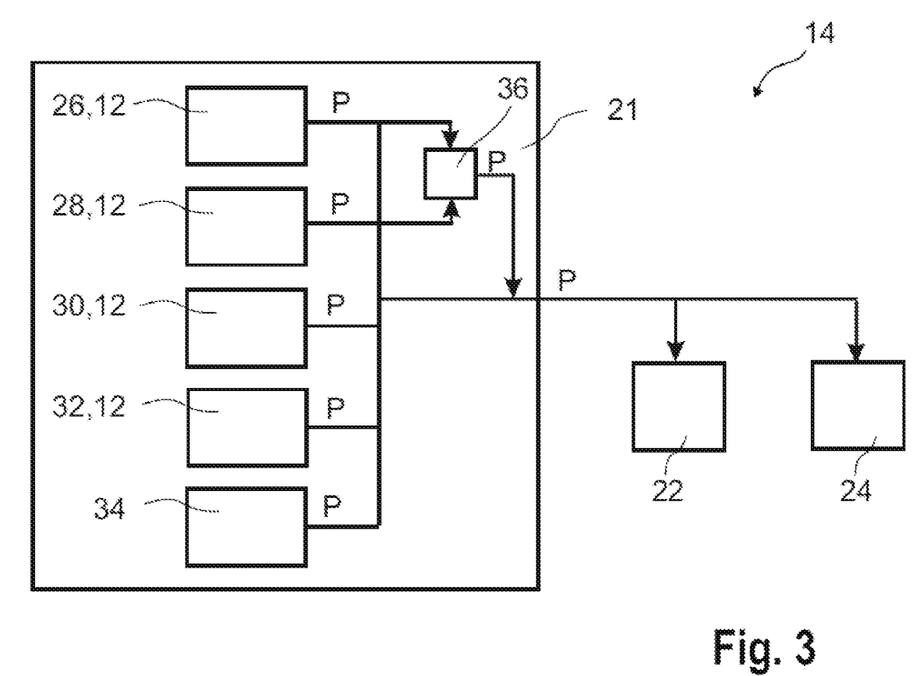
FIG. 3 shows a schematic block diagram of the vehicle parameter acquisition module from FIG. 2.
Figure 4:
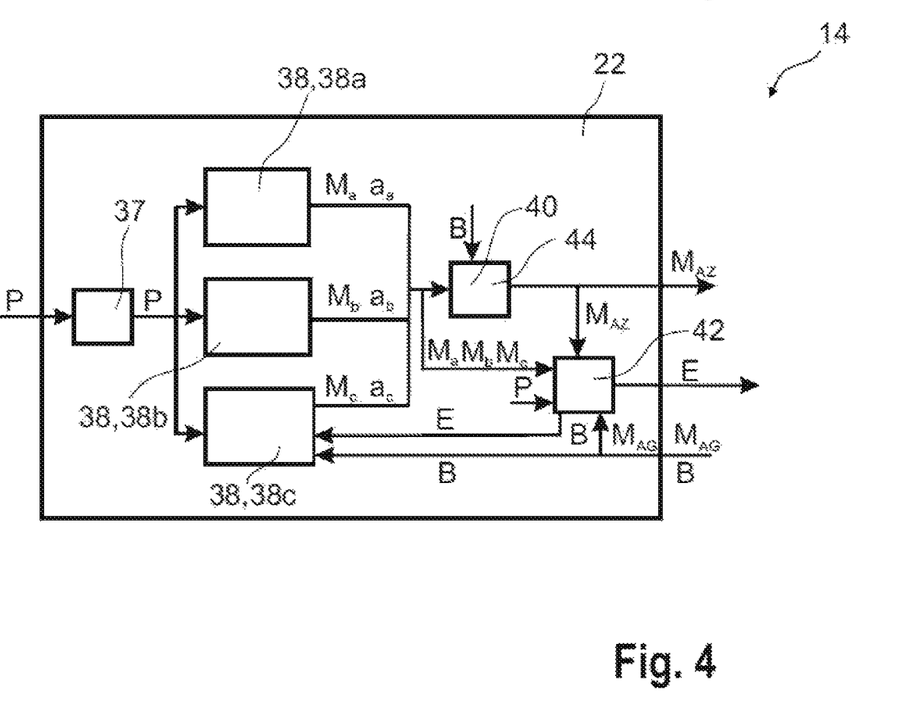
FIG. 4 shows a schematic block diagram of the driving maneuver planning module from FIG. 2.
Figure 5:
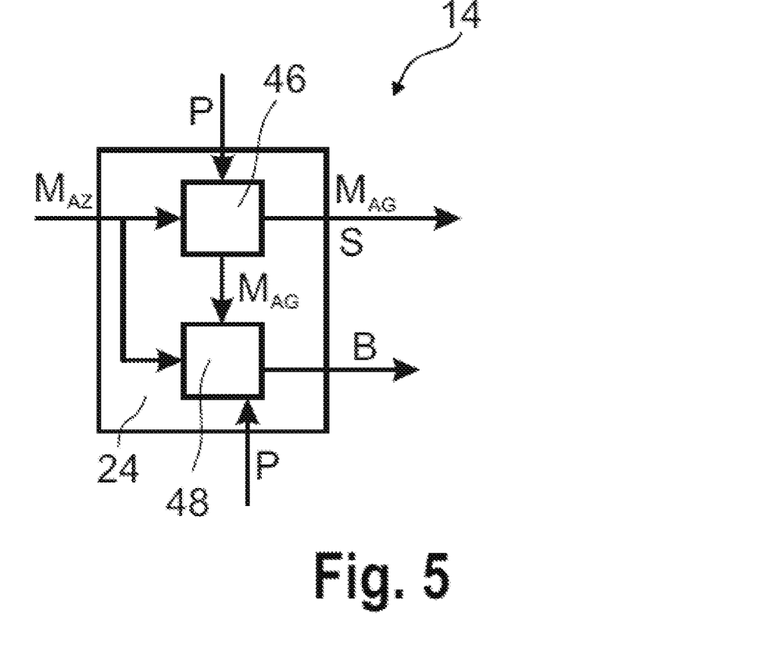
FIG. 5 shows a schematic block diagram of the motion planning module from FIG. 2.

FIGS. 3 to 5 show the vehicle parameter acquisition module 21 and the driving maneuver planning module 22 or the motion planning module 24 in detail in a block diagram.

As FIG. 3 shows, the vehicle parameter acquisition module 21 also includes a route planning module 34 and a further processing module 36 in addition to the sensors 12 described above.

The route planning module 34 plans a route for the vehicle 10 to a desired destination. For this purpose, it has access to corresponding map material, which is stored, for example, on the data carrier 19, and can use the position data of the position sensor 26 to navigate from the current geographical position to the destination. The route planning module 34 thus generates navigation data, which is also understood as vehicle parameters P in the context of this invention.

The further processing module 36 is designed to combine the data from the sensors 12 and/or the vehicle parameters P in order to obtain processed and/or more detailed vehicle parameters P.

FIG. 3 shows that the position data and the camera data is combined. The inclusion of the number of detected lanes, the detected road signs and/or the surrounding sights in this embodiment improves the determination of the current geographical position.

It is also conceivable to combine the data of the distance from adjacent vehicles and the camera data in order to obtain movement trajectories of adjacent vehicles and/or to predict the behavior of adjacent vehicles. The data generated by the further processing module 36 is also to be understood as the vehicle parameters P.

The vehicle parameter acquisition module 21 transmits the vehicle parameters P to the driving maneuver planning module 22 and the motion planning module 24.

In FIG. 4, the driving maneuver planning module 22 is shown in a schematic block diagram and comprises a processing module 37, three decision-making submodules 38, a decision maker 40 and a knowledge module 42.

The processing module 37 receives the vehicle parameters P from the vehicle parameter acquisition module 21 and is designed to prepare the vehicle parameters P for further use.

The processing module 37 transforms the vehicle parameters P into a common coordinate system, for example. It is also conceivable that the processing module 37 generates a model for the behavior of adjacent vehicles.

The processing module 37 transfers the processed vehicle parameters P and/or the unprocessed vehicle parameters P to the decision-making submodules 38.

The decision-making submodules 38 each determine at least one possible driving maneuver M based on the vehicle parameters P, with the various decision-making submodules 38 determining a possible driving maneuver M based on the vehicle parameters P, by using various methods or models. The determination is based, for example, on a cost function, a decision tree, a vehicle-following model, in particular a distance-dependent vehicle-following model and/or a psychophysical vehicle-following model according to Wiedemann, and/or a state machine.

In the exemplary embodiment shown, three different decision submodules 38 are provided, namely a first, a second and a third decision submodule 38a, 38b and 38c.

The first decision-making submodule 38a determines a possible driving maneuver $M_a$ as a function of all or a plurality of the vehicle parameters P by means of a state machine.

The second decision-making submodule 38b is an occupant and/or the driver of the vehicle 10, who determines a possible driving maneuver $M_b$.

In the embodiment shown, the third decision-making submodule 38c determines a possible driving maneuver $M_c$ by means of a reinforcing machine learning decision making process.

For example, the third decision-making submodule 38c has an artificial neural network that executes the machine learning decision process. However, it is also conceivable that the machine learning decision process is a Markow decision process, a partially observable Markow decision process and/or based on game theory.

In general, it is conceivable that the decision-making submodules 38 determine more than one possible driving maneuver M and/or that different decision-making submodules 38 select the same driving maneuver M. For example, the possibility that driving maneuver M of the decision-making submodule 38a, i.e., the driving maneuver $Ma$ and the possible driving maneuver M of the decision-making submodule 38b, i.e., the driving maneuver $M_b$, are identical.

The decision-making submodules 38a, 38b and 38c transmit the possible driving maneuvers $M_a$, $M_b$ and $M_c$ to the decision maker 40.

Each decision-making submodule 38 is a weighting factor a of the credibility assigned to the relevant decision-making submodule 38, i.e., the weighting factor a indicates the probability that the possible driving maneuver M determined by the corresponding decision-making submodule 38 is the best or best-possible driving maneuver.

The weighting factors a are not the confidence values that are identified during the determination of the possible driving maneuver M by the respective decision-making submodule 38 or the decision process being used but can be based on these.

The weighting factors a can be adjusted over time.

The weighting of the credibility $a_a$ of the first decision-making submodule 38a and the weighting of the credibility $a_b$ of the second decision-making submodule 38b is, for example, initially higher than the weighting of the credibility $a_c$ of the third decision-making submodule 38c, which determines the possible driving maneuver $M_c$ by means of the reinforcing machine learning decision process.

The weighting factors a are known to the decision maker 40 and are, for example, stored in a memory of the decision maker 40.

The decision maker 40 selects one of the possible driving maneuvers $M_a$, $M_b$ and $M_c$ based, among other things, on the weighting factors $a_a$, $a_b$, $a_c$ and thus determines the driving maneuver $M_{AZ}$ to be executed, which is transmitted to the motion planning module 24.

In the embodiment shown, the decision maker 40 is a selection module 44, that is to say a module that determines the driving maneuver MAZ to be executed by means of a computer-assisted selection process.

Preferably, the selection module 44 is an artificial neural network with at least the possible driving maneuvers $M_a$, $M_b$, $M_c$, the vehicle parameters P and/or the weighting factors $a_a$, $a_b$, $a_c$ are the input variables of the artificial neural network, and the driving maneuver $M_{AZ}$ to be executed is the at least one output variable of the artificial neural network.

In general, it is also conceivable that a decision-making submodule 38, which determines several possible driving maneuvers M, defines a preference and thus assists the decision maker 40 in the selection of the driving maneuver $M_{AZ}$ to be executed. The decision-making submodule 38a selects, for example, a preferred possible driving maneuver M and/or defines a hierarchy among the selected driving maneuvers M.

Furthermore, it is conceivable that the selection module 44 checks whether a similar driving situation has already existed and selects the possible driving maneuver M of the decision-making submodule 38 that made the best decision in the similar driving situation.

It is also conceivable that the decision maker 40 is an occupant and/or the driver of the vehicle 10, who has possible driving maneuvers M displayed on a screen and makes a decision by selecting and/or performing a driving maneuver M.

The driving maneuver $M_{AZ}$ to be executed is then transmitted to the motion planning module 24.

FIG. 5 shows a schematic block diagram of the motion planning module 24, which, in the exemplary embodiment shown, comprises an analysis module 46 and an assessment module 48.

As explained above, the motion planning module 24 receives the vehicle parameters P from the vehicle parameter acquisition module 21 and the driving maneuver $M_{AZ}$ to be executed from the driving maneuver planning module 22.

The analysis module 46 analyzes the driving maneuver MAZ to be executed in terms of its feasibility based, among other things, on the vehicle parameters P. In particular, it can estimate whether a collision of the vehicle 10 with an object, for example another vehicle, would take place during the execution of the driving maneuver.

The analysis module 46 uses the uncertainties in the trajectories of adjacent vehicles, the uncertainties in the speed of the vehicle 10 and the uncertainties in the course of the lane, for example, in order to be able to estimate the feasibility of the driving maneuver.

The analysis module 46 can also determine whether the end of the driving maneuver can be reached, for example, due to physical limits or comfort limits for longitudinal and lateral acceleration.

The driving maneuver MAG that the vehicle 10 executes is then determined on the basis of the feasibility analysis and/or the accessibility analysis performed by the analysis module 46. For this purpose, the analysis module 46 provides the control commands S which are transmitted to the driver assistance system 16.

The evaluation module 48, on the other hand, generates the evaluation variable B for a driving maneuver.

The evaluation module 48 evaluates the possible driving maneuver M, the driving maneuver $M_{AZ}$ to be executed and/or the driving maneuver $M_{AG}$ that was executed. For this purpose, the evaluation module 48 uses, among other things, the vehicle parameters P.

For the evaluation of the driving maneuver $M_{AZ}$ to be executed or the driving maneuver $M_{AG}$ that was executed, the evaluation module 48 stores and/or analyzes certain vehicle parameters P determined during the execution of the driving maneuver $M_{AZ}$ to be executed or the driving maneuver MAG that was executed and/or accesses the results of the feasibility analysis of the analysis module 46.

For example, the evaluation variable B includes the smallest distance to adjacent vehicles, the highest lateral acceleration of the vehicle 10 during the driving maneuver and/or a value that indicates whether the maximum speed of the traffic regulations was observed.

Further values or parameters as part of the evaluation variable B are conceivable as well, of course.

The evaluation variable B thus contains a plurality of values. The evaluation variable B is, for example, a vector which contains the values mentioned.

Furthermore, the evaluation variable may be a multidimensional vector and comprise, for example, one or more of the previously mentioned value or values for each time step of the driving maneuver.

After the evaluation module 48 has created the evaluation variable B, the motion planning module 24 transmits the driving maneuver $M_{AG}$ and returns the evaluation variable B to the driving maneuver planning module 22.

The evaluation variable B is then transmitted to the decision-making submodule 38c, and the decision-making submodule 38c is adapted by including the evaluation variable B. More specifically, the machine learning decision process, in particular the artificial neural network that has determined the possible driving maneuver $M_c$ is trained by using the evaluation variable B.

The selection module 44, in particular the artificial neural network of the selection module 44, can also be trained and adapted by means of the evaluation variable B.

The weighting factors $a_a$, $a_b$, $a_c$ of the credibility of the decision-making submodules 38a, 38b and 38c can also be adapted by using the evaluation variable B, for example by the selection module 44 or the decision maker 40.

As can be seen in FIG. 4, the knowledge module 42 of the driving maneuver planning module 22 is configured to provide the knowledge data E. The knowledge data E includes, for example, the possible driving maneuvers $M_a$, $M_b$, $M_c$, the driving maneuver $M_{AZ}$ to be executed, the vehicle parameters P, the driving maneuver $M_{AG}$ that was executed and the evaluation variable B.

The knowledge module 42 stores, for example, the vehicle parameters P that were measured during the maneuver MAG that was executed and evaluates them so that only relevant data of the vehicle parameters P is passed on as knowledge data E.

It is also conceivable for the knowledge data E to have more precise data on the selection process of the decision maker 40.

As indicated by the arrows, the knowledge data E is provided by the driving maneuver planning module 22 so that, for example, further vehicles can access the knowledge data E of the vehicle 10.

In addition, the knowledge data E can be used to adapt one of the decision-making submodules 38, for example to train the reinforcing machine learning decision process.

The method specified is then explained in more detail below with the help of a greatly simplified example of a lane change of the vehicle 10 on a freeway.

The sensors 12 of the vehicle 10 detect, for example, another vehicle in the lane in which the vehicle 10 is traveling. The other vehicle moves at a certain distance in front of the vehicle 10 and has a lower speed than the vehicle 10. If the vehicle 10 were to follow the lane at a constant speed, there would be a collision between the vehicle 10 and the other vehicle.

Therefore, the speed of the other vehicle and the distance to the other vehicle are transmitted as vehicle parameters P to the driving maneuver planning module 22. In addition, the sensors 12 also recognize that the adjacent lane, the fast lane, is free.

Based on these vehicle parameters P, the driving maneuver planning module 22, in particular, the decision-making submodules 38a, 38b, 38c, determines possible driving maneuvers $M_a$, $M_b$ and $M_c$. A possible driving maneuver Ma could be that the vehicle 10 greatly reduces its speed and adapts to the speed of the other vehicle. As a further possible driving maneuver $M_b$, it is determined that the vehicle 10 is changing lanes in order to pass the other vehicle.

The possible driving maneuvers $M_a$, $M_b$ and $M_c$ are transmitted to the decision maker 40, and the decision maker then selects one of the driving maneuvers $M_a$, $M_b$, $M_c$, for example the first possible driving maneuver $M_a$. In the following, this driving maneuver is the driving maneuver $M_{AZ}$ to be executed.

The driving maneuver planning module 22 transmits at least the driving maneuvers $M_{AZ}$ to be executed to the motion planning module 24, which transmits corresponding control signals S to the driver assistance system 16.

In the exemplary embodiment described, the driving maneuver planning module 22 transmits a very unspecific driving maneuver $M_{AZ}$ to the motion planning module 24, namely the driving maneuver for slowing down the speed, and the motion planning module 24 converts this instruction or these objectives into specific control commands S.

In general, precise instructions are conceivable as well, for example, that the vehicle 10 first has to let another vehicle in the adjacent lane pass then increase the speed by a certain value and switch to the adjacent lane at the same time.

Furthermore, it is also conceivable that the driving maneuver planning module 22 defines a corridor, for example a time corridor or a route corridor, in which the motion planning module 24 has to execute a driving maneuver.

The sensors 12, for example, detect a stationary car in the lane and transmit the request to the motion planning module 24 that the vehicle 10 must change lanes or stop within the next 5 seconds and/or within the next 200 m.

Furthermore, it is also conceivable that the driving maneuver planning module 22 plans the possible driving maneuvers M in great detail and, for example, comprises corresponding control commands S and/or signals G for the control devices 18 of the vehicle 10.

The motion planning module 24 determines the evaluation variable B, which is negative in the example. The motion planning module 24 punishes the selection of the driving maneuver $M_a$ here since the driving maneuver $M_a$ causes the vehicle to take longer to reach the destination and since the brakes have to be applied.

The driving maneuver planning module 22 thus receives a negative evaluation variable B from the motion planning module 24 and adjusts the decision-making submodule 38 in such a way that the decision-making submodule 38 or the decision maker 40, for example by adapting the weighting factors $a_a$, $a_b$, $a_c$, would chose the maneuver $M_b$ next time.

In this way, practical experience is taken into account when selecting the driving maneuver.

Three embodiments of a system 50 for determining a driving maneuver are shown below with reference to FIGS. 6 to 8.

The system 50 has a plurality of vehicles 10, which are essentially configured as described above, so that only the differences are addressed below. Identical and functionally identical components and modules are provided with the same reference symbols.

Figure 6:
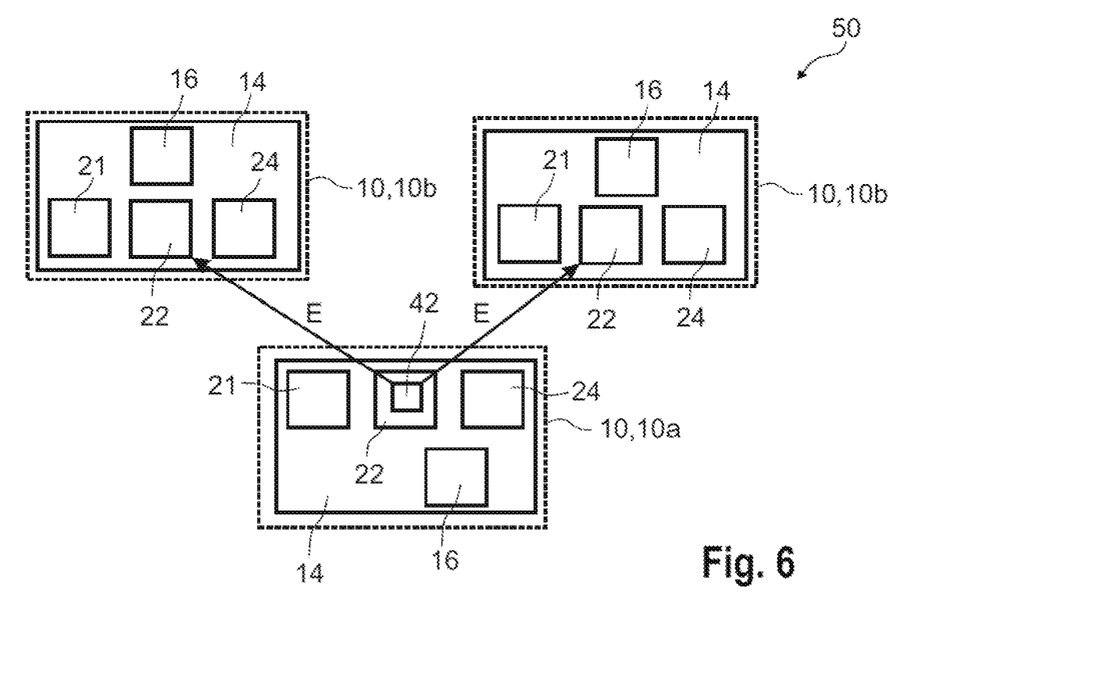
FIG. 6 shows a first embodiment of a system for determining a driving maneuver in a schematic block diagram.

FIG. 6 shows a first embodiment of the system 50 in a schematic block diagram. The system 50 in FIG. 6 has three vehicles 10, namely a vehicle 10*a* that performs the driving maneuver MAG and two vehicles 10*b* that receive the knowledge data E of the vehicle 10*a*.

The vehicle 10*a*, more precisely the control unit 14 of the vehicle 10*a*, determines analogously to the embodiment of the control unit 14, described in FIGS. 1 to 5, at least one possible driving maneuver and/or one driving maneuver to be executed, executes a driving maneuver by means of the driving assistance system 16 and generates the corresponding knowledge data E.

The knowledge data E is then transmitted to the driving maneuver planning modules 22 of the vehicles 10*b* so that the driving maneuver planning modules 22 of the vehicles 10*b* can adapt their corresponding decision-making submodule 38.

In other words, the decision-making submodules 38 of the vehicles 10*b* are adapted based on a driving maneuver that the vehicle 10*a* has performed. The data exchange between the vehicles 10, i.e. the transmission of the knowledge data, can take place via a wireless interface.

Figure 7:
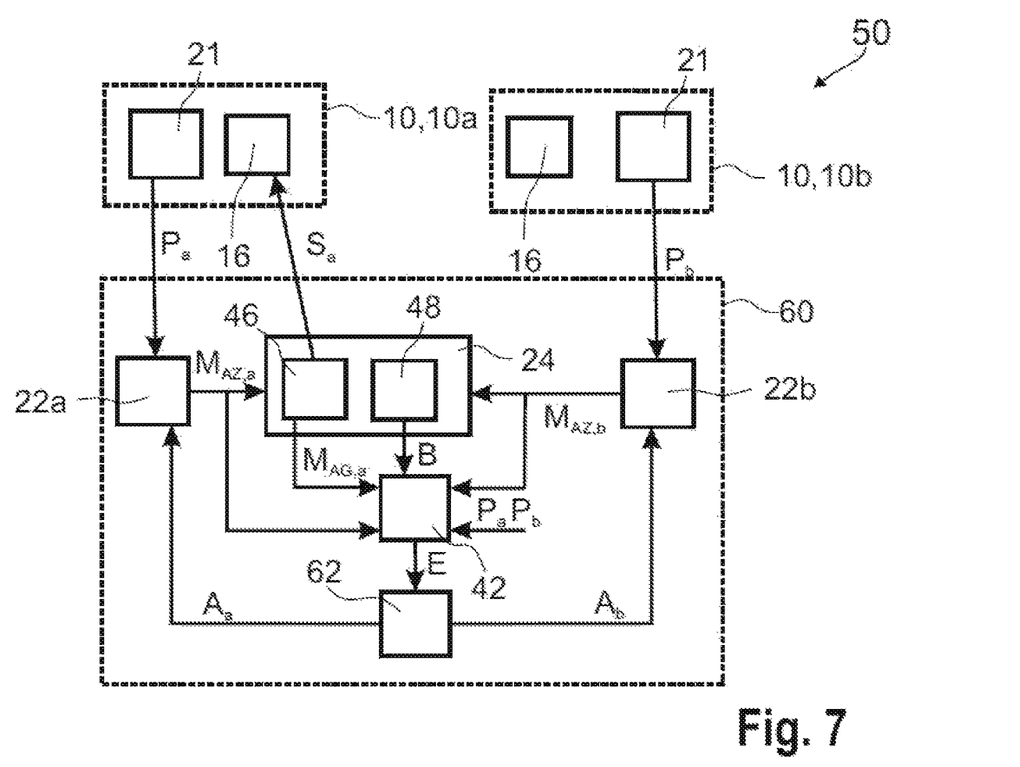
FIG. 7 shows a schematic block diagram of a system for determining a driving maneuver in a second embodiment.

FIG. 7 describes a second embodiment of the system 50 for determining a driving maneuver in a schematic block diagram. The embodiment shown essentially corresponds to the embodiment shown in FIG. 6 so that only the differences are discussed below.

In the embodiment shown in FIG. 7, only the vehicle parameter acquisition module 21 and the driver assistance system 16 are implemented in the vehicles 10*a* and 10*b*.

A separate, stationary server 60 is provided, on which the driving maneuver planning module 22*a* of the vehicle 10*a*, the driving maneuver planning module 22*b* of the vehicle 10*b* and the shared motion planning module 24 are implemented.

The server 60 is in contact with the vehicles 10, for example via a wireless connection such as the cellular network. Corresponding transmitters and receivers, which are not shown in FIG. 7, are provided for the server 60 and the vehicles 10*a* and 10*b*.

Via the wireless connection, the driving maneuver planning module 22*a* receives the vehicle parameters $P_a$ of the vehicle 10*a*, and the driving maneuver planning module 22*b* receives the vehicle parameters $P_b$ of the vehicle 10*b*.

As already described, the driving maneuver planning modules 22*a* and 22*b* provide the driving maneuver $M_{AZ,a}$ to be executed for the vehicle 10*a* and $M_{AZ,b}$ for the vehicle 10*b*. The motion planning module 24 determines the driving maneuvers to be executed.

In the embodiment shown in FIG. 7, the motion planning module 24 determines the driving maneuver $M_{AG,a}$ for the vehicle 10*a* and no driving maneuver for the vehicle 10*b*. The motion planning module 24 transmits the corresponding control commands Sa to the driver assistance system 16 of the vehicle 10*a*.

In addition, only one knowledge module 42 is provided, which is implemented on the server side. The knowledge module 42 generates the knowledge data E based on the driving maneuvers $M_{AZ,a}$ and $M_{AZ,b}$ to be executed, the vehicle parameters $P_a$ and $P_b$, the evaluation variable B and/or the driving maneuver $M_{AG,a}$ that was executed.

The knowledge data E is transmitted to an adaptation module 62 that provides the adaptation information A so that the driving maneuver planning module 22*a* of the vehicle 10*a* is adapted by the adaptation information $A_a$, and the driving maneuver planning module 22*b* of the vehicle 10*b* is adapted by the adaptation information $A_b$.

In other words, the server 60 adapts the decision submodules of the driving maneuver planning modules 22*a* and 22*b* accordingly.

Figure 8:
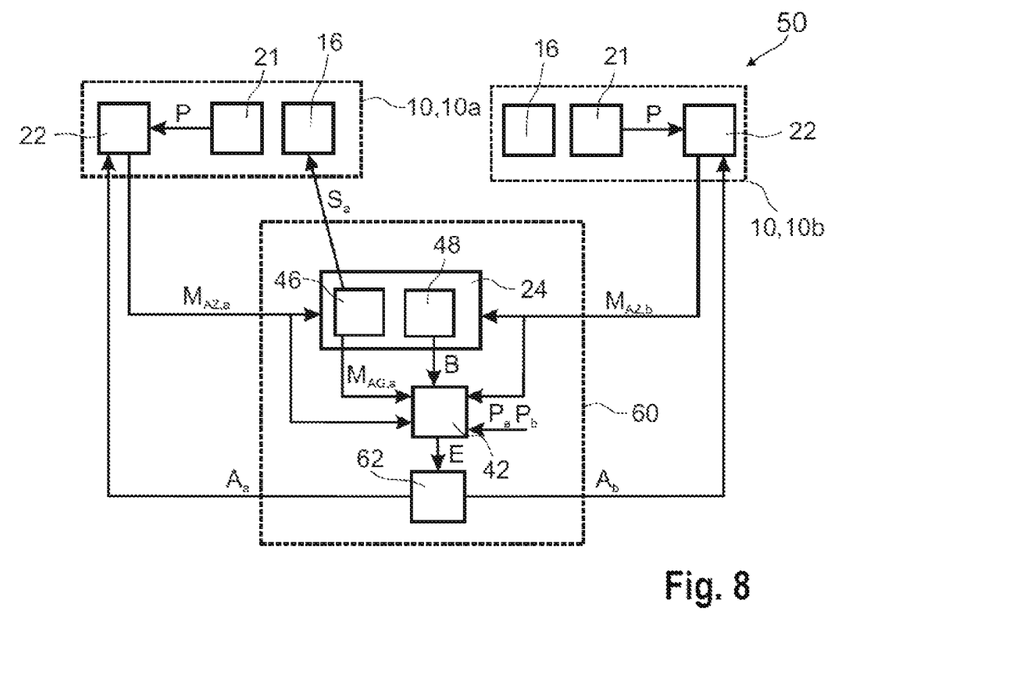
FIG. 8 shows a third embodiment of a system for determining a driving maneuver in a schematic block diagram.

FIG. 8 shows a third embodiment of the system 50 in a schematic block diagram.

In contrast to the embodiment shown in FIG. 7, the driving maneuver planning modules 22 of the vehicles 10 are each implemented in the vehicles 10 and not on the server 60.

Correspondingly, the server 60 transmits the adaptation information $A_a$ and $A_b$ to the respective driving maneuver planning module 22 of the vehicles 10 so that with the adaptation information $A_a$ at least one decision-making submodule of the driving maneuver planning module 22 of vehicle 10*a* and with the adaptation information $A_b$, at least one decision-making submodule of driving maneuver planning module 22 of vehicle 10*ba* is adapted.

For simplification, the embodiments of FIGS. 6, 7 and 8 each only show two vehicles 10. The vehicle 10*a* performs a driving maneuver, and the driving maneuver planning module 22*b* of the vehicle 10*b* is adapted by using the knowledge data E. In general, any number of vehicles 10*a* and 10*b* is conceivable.

System 50 enables "fleet learning", that is, vehicles can adapt their driving maneuver planning modules 22, in particular their decision-making submodule 38, based on experience, i.e., planned and/or executed driving maneuvers in special traffic situations, by other vehicles without having to have been part of these traffic situations.

The representation of FIGS. 7 and 8 is to be understood as an example. The server 60 is intended to illustrate that the motion planning module 24 and/or the driving maneuver planning module 22 of the system 50 can also be executed on the server 60, which serves as the central control center for the traffic.

In general, only individual modules of the system 50, such as the analysis module 46, the route planning module 34, and the knowledge module 42 and/or the evaluation module 48 can also be executed on the server 60.

In other words, not all modules of the system 50 need to be executed within vehicle 10.

For illustration purposes, the description of the embodiments differentiates between possible driving maneuvers M, the driving maneuver $M_{AZ}$ to be executed and the driving maneuver $M_{AG}$ that was executed. In general, these driving maneuvers do not have to be different, but may be identical.

In particular, it is possible that the analysis module 46 only determines whether a driving maneuver can be executed or not. If the driving maneuver cannot be executed, the motion planning module 24 and/or the analysis module 46 would instruct the driving maneuver planning module 22 to provide a new driving maneuver, which in turn is analyzed.

The invention claimed is:

1. A method for determining a driving maneuver of a vehicle, the method comprising:
receiving vehicle parameters generated by a vehicle parameter acquisition module of a first vehicle;
determining at least one possible driving maneuver via a driving maneuver planning module based on the vehicle parameters received, an evaluation variable, and first knowledge data for one or more second vehicles that includes data characterizing an executed driving maneuver by the one or more second vehicles with respect to the first vehicle, the at least one possible driving maneuver being determined by means of at least one decision-making submodule of the driving maneuver planning module;
transmitting a driving maneuver selected from the at least one possible driving maneuver from the driving maneuver planning module to a motion planning module of the first vehicle;
generating the evaluation variable via the driving maneuver planning module based on at least one previously executed driving maneuver by the first vehicle;
controlling via the motion planning module the first vehicle to execute a driving maneuver corresponding to the at least one possible driving maneuver with respect to the one or more second vehicles; and
transmitting second knowledge data comprised of at least the vehicle parameters, the executed driving maneuver of the first vehicle, and/or the evaluation variable from the first vehicle to a driving maneuver planning module of the one or more second vehicles to allow a decision-making submodule of the one or more second vehicles to adapt and execute a driving a maneuver of the one or more second vehicles in response to the executed driving maneuver of the first vehicle.

2. The method according to claim 1, wherein the driving maneuver to be executed is selected from a plurality of possible driving maneuvers determined by the driving maneuver planning module based on the vehicle parameters, the evaluation variable, and the knowledge data.

3. The method according to claim 2, wherein the evaluation variable is determined by the motion planning module on the basis of a previously executed driving maneuver and/or vehicle parameters during the execution of the previously executed driving maneuver, wherein the evaluation variable comprises data characterizing a smallest distance to the one or more second vehicles that are adjacent to the first vehicle, a highest lateral acceleration of the first vehicle during the previously executed driving maneuver, a highest longitudinal acceleration and/or a cost value of the previously executed driving maneuver.

4. The method according to claim 1, wherein the at least one decision-making submodule determines the at least one possible driving maneuver based on a cost function, a decision tree, a vehicle-following model comprising a distance-dependent vehicle-following model and/or a psychophysical vehicle-following model according to Wiedemann, and/or a state machine.

5. The method according to claim 1, wherein at least one of the at least one decision-making submodules enhances the at least one possible driving maneuver by means of a machine learning decision process comprising an enhanced machine learning decision process.

6. The method according to claim 5, wherein the machine learning decision process is at least implemented by an artificial neural network, based on game theory, a Markow decision process and/or a partially observable Markow decision process.

7. The method according to claim 5, wherein the evaluation variable is used to train a machine learning decision process of the at least one decision-making submodule.

8. The method according to claim 1, wherein a plurality of decision-making submodules is provided, each of which determines at least one possible driving maneuver, wherein a decision maker selects the driving maneuver from the determined possible driving maneuvers, which is transmitted to the motion planning module.

9. The method according to claim 8, wherein a selection module selects the driving maneuver to be executed on the basis of weighting of a credibility of the corresponding decision-making submodule and/or a frequency of an occurrence of a possible driving maneuver.

10. The method according to claim 9, wherein the selection module has an artificial neural network.

11. A control device for a vehicle for controlling the vehicle, the control device to execute a method according to claim 1, wherein the vehicle is the first vehicle.

12. A vehicle with a control device designed to execute a method according to claim 1 and at least one sensor for detecting at least one vehicle parameter of the vehicle parameters, wherein the vehicle is the first vehicle.

13. A non-transitory computer-readable medium storing a computer program comprising machine readable instructions that are executable by a computing unit of a control device to perform a method according to claim 1.

14. A system for determining a driving maneuver with at least one vehicle according to claim 12, the at least one vehicle comprises the first vehicle.

15. A system according to claim 14, wherein the system comprises a server which is connected to the at least one vehicle for data connection,
wherein the motion planning module controls the at least one vehicle in such a way that the at least one vehicle performs the driving maneuver,
wherein the server receives and/or provides knowledge data for the at least one vehicle, and the server transmits the knowledge data for the at least one vehicle to the one or more second vehicles, and/or the server adapts the decision-making submodule of the at least one other vehicle on the basis of the knowledge data for the at least one vehicle and transmits adaptation information to the one or more second vehicles.

* * * * *